United States Patent
Visser

(10) Patent No.: US 6,678,996 B1
(45) Date of Patent: Jan. 20, 2004

(54) COMPOSITION OF RIGID GROWING SUBSTRATE AND METHOD OF PRODUCING SAME

(75) Inventor: Cornelis Visser, 's-Gravendeel (NL)

(73) Assignee: Visser's-Gravendeel Holding B.V., Gravendeel (NL)

(*) Notice: Subject to any disclaimer, the term of this patent is extended or adjusted under 35 U.S.C. 154(b) by 0 days.

(21) Appl. No.: 09/958,537

(22) PCT Filed: Mar. 30, 2000

(86) PCT No.: PCT/NL00/00213
§ 371 (c)(1),
(2), (4) Date: Jan. 7, 2002

(87) PCT Pub. No.: WO00/60922
PCT Pub. Date: Oct. 19, 2000

(30) Foreign Application Priority Data

Apr. 14, 1999 (NL) .............................................. 1011794

(51) Int. Cl.[7] .............................................. A01G 31/00
(52) U.S. Cl. ...................................................... 47/59 S
(58) Field of Search .............................. 47/63, 64, 59, 47/9

(56) References Cited

U.S. PATENT DOCUMENTS

| | | | | |
|---|---|---|---|---|
| 3,467,609 A | * | 6/1967 | Adams et al. .................. | 47/64 |
| 3,834,072 A | * | 9/1974 | Rack .............................. | 47/74 |
| 3,842,537 A | * | 10/1974 | Bishop .......................... | 47/74 |
| 3,899,850 A | | 8/1975 | Glück et al. | |
| 4,881,344 A | * | 11/1989 | Frey et al. .................... | 47/77 |
| 4,927,455 A | * | 5/1990 | Hotta et al. ................... | 71/64 |
| 6,012,251 A | * | 1/2000 | Siegert ......................... | 47/59 |
| 6,183,531 B1 | * | 2/2001 | De Groot et al. ............. | 71/24 |

FOREIGN PATENT DOCUMENTS

| | | |
|---|---|---|
| EP | 0350132 A1 | 1/1990 |
| FR | 2445103 A1 | 7/1980 |
| GB | 2244059 A | 11/1991 |
| WO | WO 9300797 A1 | 1/1993 |
| WO | WO 97/16961 A1 | 5/1997 |

* cited by examiner

Primary Examiner—Charles T. Jordan
Assistant Examiner—Francis T. Palo
(74) Attorney, Agent, or Firm—Banner & Witcoff, Ltd.

(57) ABSTRACT

The invention relates to a substrate composition, comprising substrate material and material providing structure and form arranged distributed in the substrate material, wherein the particles forming part of the structure-providing material are mutually connected at least partially by a binder. As a result of this binder it is no longer necessary to perform a temperature treatment, so that the associated drawbacks are avoided. In addition, the form-retention of such a unit is considerably greater than the prior art units. The substrate material is preferably formed by potting compost or another organic material. The binder is preferably formed by a pre-polymer reacting with water. This has the advantage that the polymerization takes place when water comes into contact with the binder. This takes place for instance when the binder is brought into contact with the potting compost.

13 Claims, 2 Drawing Sheets

COMPOSITION OF RIGID GROWING SUBSTRATE AND METHOD OF PRODUCING SAME

BACKGROUND OF THE INVENTION

1. Field of the Invention

The invention relates to a substrate composition comprising substrate material and material providing structure and shape arranged distributed in the substrate material.

2. Description of Related Art

Such a substrate composition is known from EP-A-0 249 261.

In this prior art substrate composition use is made of substrate material formed by fibres and the material providing structure and shape is formed by thermoplastic fibres.

This has the result that in order to form form-retaining units the substrate material must be subjected to a temperature treatment. This requires much energy. The form-retention of such a unit is moreover generally very mediocre; such a unit will already disintegrate when only a small force is applied. This makes mechanical handling of such units difficult.

SUMMARY OF THE INVENTION

The object of the present invention is to provide a substrate composition, wherein the above stated drawbacks are obviated.

This objective is achieved in that the particles are mutually connected by a binder.

As a result of this binder it is no longer necessary to perform a temperature treatment, so that the associated drawbacks are avoided. In addition, the form-retention of such a unit is considerably greater than of the prior art units.

The substrate material is preferably formed by potting compost or other organic material.

Particularly in recent years much resistance has arisen to the use of pure synthetic substrate substances, because it is assumed that these have an adverse effect on the flavour of the products cultivated on substrate manufactured from such material. There is therfore an increasing need for the use of substrate of organic origin.

Further known is the use of foam particles as material providing structure and shape in such prior art substrates. The foam particles have the function here of improving the water-absorbing properties of the substrate. The presence of such foam particles thus also makes it possible to apply the binder according to the present invention. The advantage of the present invention is herein combined with the advantage of applying foam particles.

It is pointed out here that the present invention is certainly not limited to the application of foam particles; the use of fibres is envisaged in the first instance.

A combination of both forms is of course also possible.

According to a preferred embodiment the fibres or foam particles are formed from a polymer.

The binder is preferably formed by a pre-polymer reacting with water.

This has the advantage that the polymerization takes place when water comes into contact with the binder. This takes place for instance when the binder is brought into contact with the potting compost.

The degree of integrity and strength of the units formed from the substrate composition can be determined by varying the quantity of fibres and the amount of binder.

Other attractive embodiments are stated in the remaining claims.

BRIEF DESCRIPTION OF THE DRAWINGS

The present invention will be elucidated hereinbelow with reference to the annexed drawings, in which.

DETAILED DESCRIPTION OF THE INVENTION

Figure 1:
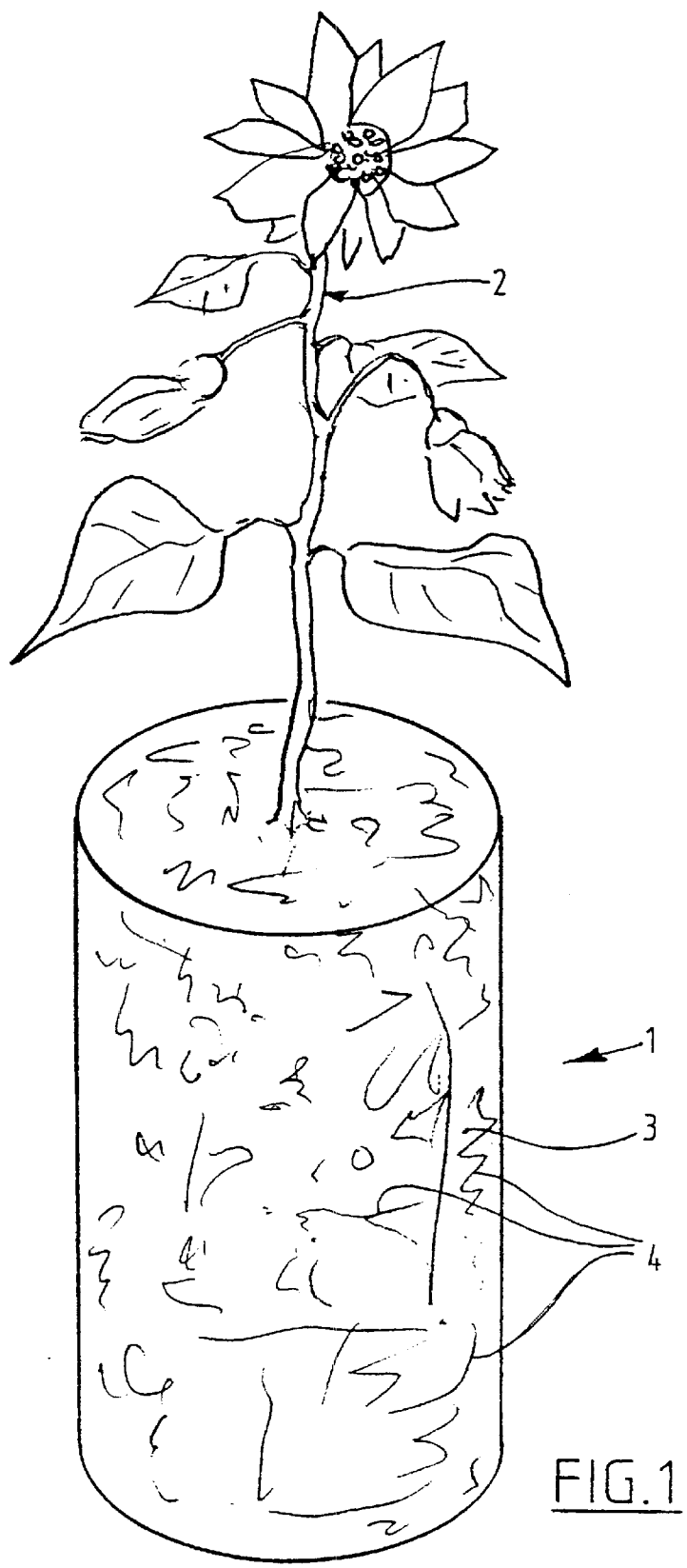
FIG. 1 shows a perspective view of a plant block which is manufactured with the substrate composition according to the present invention.

As shown in FIG. 1, the preferably applied mixture according to the present invention is formed by potting compost, around which a certain content of fibres is arranged. Block 1 is herein provided with a plant 2. On the walls of block 1 the substrate is made up of potting compost 3 and fibres 4. Although potting compost is envisaged in the first instance, it is possible to make use of other substrates such as synthetic granulate, mineral wool and so on.

It is however of importance for the invention that fibres are arranged for strengthening purposes which are mutually adhered by means of a glue connection so that the whole composition acquires a certain structure. This provides the option of mechanically processing such blocks 1 without them crumbling. In view of the increased automation in horticulture, this is of the greatest importance.

Figure 2:
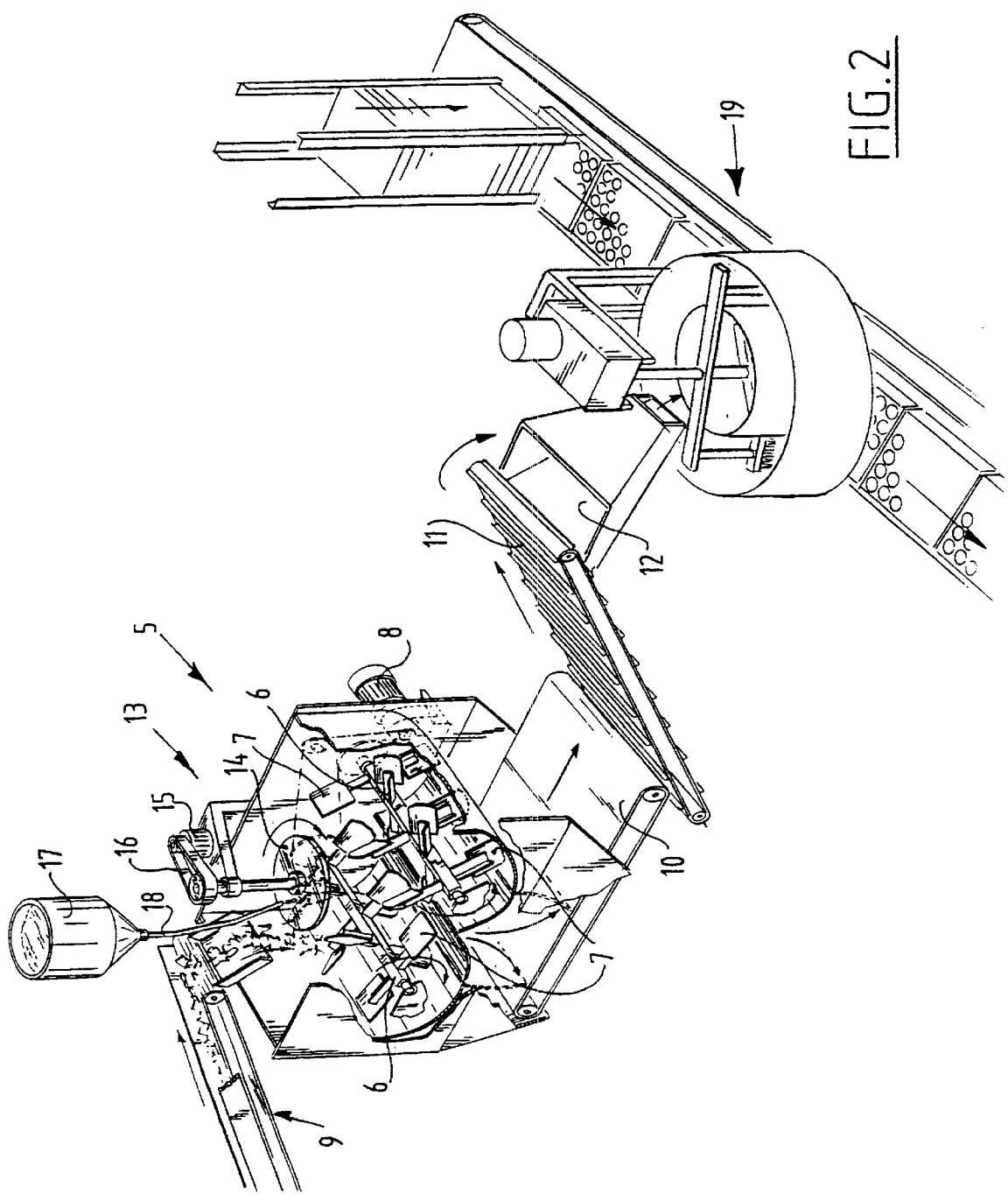
FIG. 2 shows a partly broken-away perspective view of a device for manufacturing such a block.

The starting point for preparation of such a substrate composition is a mixing device 5 as shown in FIG. 2. Mounted in this mixing machine are two shafts 6, on each of which is arranged a number of blades 7 and wherein both shafts 6 are driven by an electric motor 8 via a transmission.

A conveyor belt 9 further leads to the upper side of the mixing device and a conveyor belt 10 leads from the underside to a booster conveyor 11 which throws the thus created mixture into a funnel 12 and then to a filling device 19, which forms the subject of the Netherlands patent application 9300669, so that no further discussion thereof is required. This filling device otherwise forms no part of the present invention.

A dosing device 13 is further arranged for dosing the binder. This dosing device is formed by a disc 14 drivable in rotation which is disposed in a horizontal plane and which is drivable in rotation by means of an electric motor 15 and a drive 16. The whole dosing device is herein place above the mixing device. A vessel 17 is further arranged which debouches into a conduit 18 in which a constriction (not shown) is arranged so that liquid present in vessel 17 falls dropwise onto disc 14. On disc 14 the liquid is atomized to small droplets and then enters the mixing device.

Here the fibres and the potting compost are once again mixed together throughly, while it is also possible that only potting compost is fed via conveyor belt 9. Use is then made of another device, not shown in the drawing, for supplying the fibres. The binder dosing device 13 is further switched on, whereby small droplets of binder are distributed over the potting compost from disc 14. By combining the process of dispensing the binder with the process of mixing the potting compost, a good distribution of the binder through the potting compost is obtained. The thus mixed potting compost is fed to filling device 19 via conveyor belt 10, booster conveyor 11 and funnel 12.

It is also possible to apply other distributing devices, such as a spray nozzle.

In filling device 19 the material is arranged in cavities arranged in trays, whereafter the binder will cure through the reaction of the binder with water present in the potting compost. An easily handled unit is hereby obtained.

It is pointed out here that it is particularly attractive to make use of a pre-polymer which reacts with water. Such substances do not influence the growth process and are otherwise neutral, so that they can be applied without any disadvantage.

What is claimed is:

1. Substrate composition comprising a substrate material and a structure-providing material distributed in the substrate material to provide structure and shape to the substrate material, wherein the structure-providing material comprises polymeric fibers, mutually connected at least partially by a binder, wherein the structure-providing material form about 0.05–5% of the weight of the substrate composition, and the substrate material comprises potting compost or another organic material.

2. Substrate composition as claimed in claim 1 wherein the structure-providing material form about 0.1–2% of the weight of the substrate composition.

3. Substrate composition as claimed in claim 2 wherein the structure-providing material form about 0.2–1% of the weight of the substrate composition.

4. Substrate composition as claimed in claim 1 wherein the structure-providing material are formed at least partially by foam particles.

5. Substrate composition as claimed in claim 1 wherein the fibers have a mass/unit length of 1–100 dTEX.

6. Substrate composition as claimed in claim 5 wherein the fibers have a mass/unit length of 2–50 dTEX.

7. Substrate composition as claimed in claim 6 wherein the fibers have a mass/unit length of 5–20 dTEX.

8. Substrate composition as claimed in claim 5 wherein the fibers have a length in the range between 3 mm and 50 mm.

9. Substrate composition as claimed in claim 8 wherein the fibers have a length in the range between 5 mm and 30 mm.

10. Substrate composition as claimed in claim 9 wherein the fibers have a length between 8 mm and 20 mm.

11. Substrate composition as claimed in claim 1 wherein the structure-providing material are connected with a pre-polymer reacting with water.

12. Substrate composition as claimed in claim 11 wherein the pre-polymer is a polyurethane prepolymer.

13. Substrate composition as claimed in claim 1 wherein the composition is a form-retaining unit.

\* \* \* \* \*

UNITED STATES PATENT AND TRADEMARK OFFICE
CERTIFICATE OF CORRECTION

PATENT NO. : 6,678,996 B1
DATED : January 20, 2004
INVENTOR(S) : Cornelis F.T. Visser It is certified that error appears in the above-identified patent and that said Letters Patent is hereby corrected as shown below:

Title page,
Item[75], Inventor, -- F.T. -- has been inserted between "Cornelis" and "Visser."

Signed and Sealed this

Thirteenth Day of July, 2004

JON W. DUDAS
*Acting Director of the United States Patent and Trademark Office*